United States Patent

[11] 3,633,435

[72] Inventor Alton E. Farr
 Rolling Hills, Calif.
[21] Appl. No. 86,131
[22] Filed Nov. 2, 1970
[45] Patented Jan. 11, 1972
[73] Assignee McDonnell Douglas Corporation

[54] BIDIRECTIONAL FORCE OVERRIDE
 10 Claims, 5 Drawing Figs.
[52] U.S. Cl..................................................... 74/470,
 74/522, 74/524
[51] Int. Cl..................................................... G05g 1/04
[50] Field of Search............................................ 74/470,
 524, 522

[56] References Cited
UNITED STATES PATENTS
2,881,631 4/1959 Riccius......................... 74/470

Primary Examiner—Milton Kaufman
Attorneys—Walter J. Jason, Donald L. Royer and George W. Finch ABSTRACT: Bidirectional force override mechanisms one embodiment of which includes a first link with one end pivotally connected to a reciprocating input rod and with the other end pivotally connected to the end of a second link, the other end of which is pivotally attached to an output link which is itself pivotally mounted to rotate about a stationary pivot. The output link is further interconnected to the first link by a spring connected therebetween which acts to preload the pivotal joints of the second link and to provide relatively constant force override action which allows relative movement between the input rod and the output link when more than a predetermined load is applied in either direction across the mechanism.

PATENTED JAN 11 1972 3,633,435
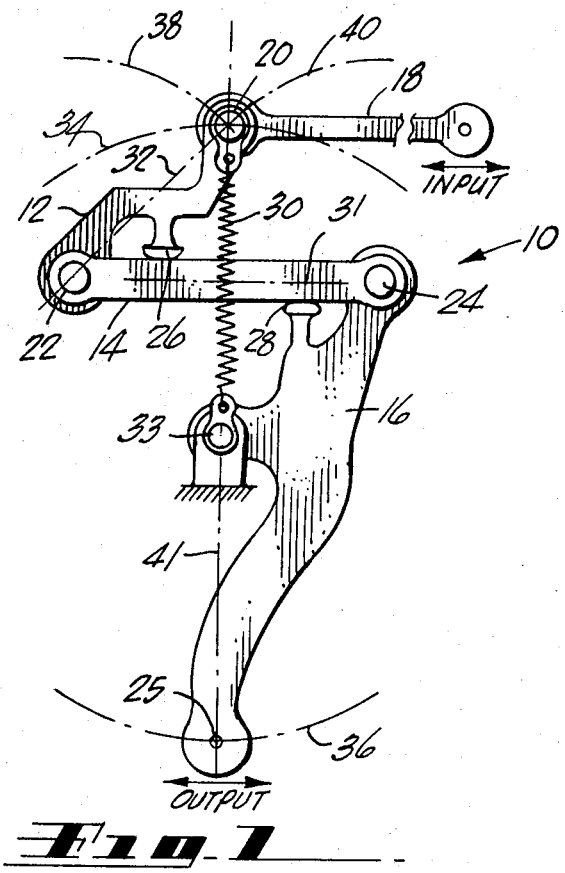
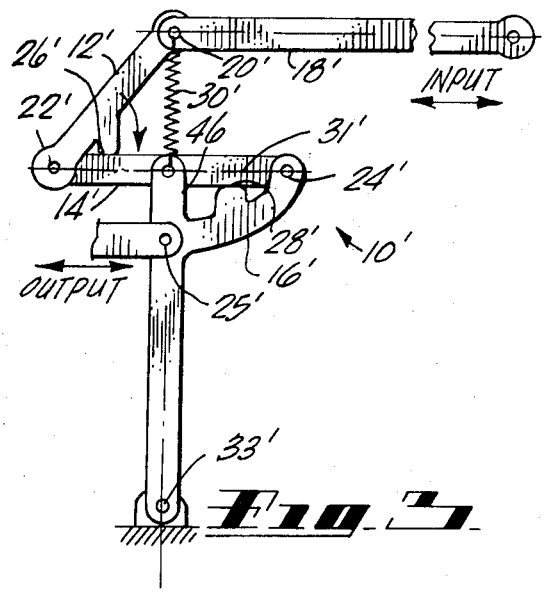
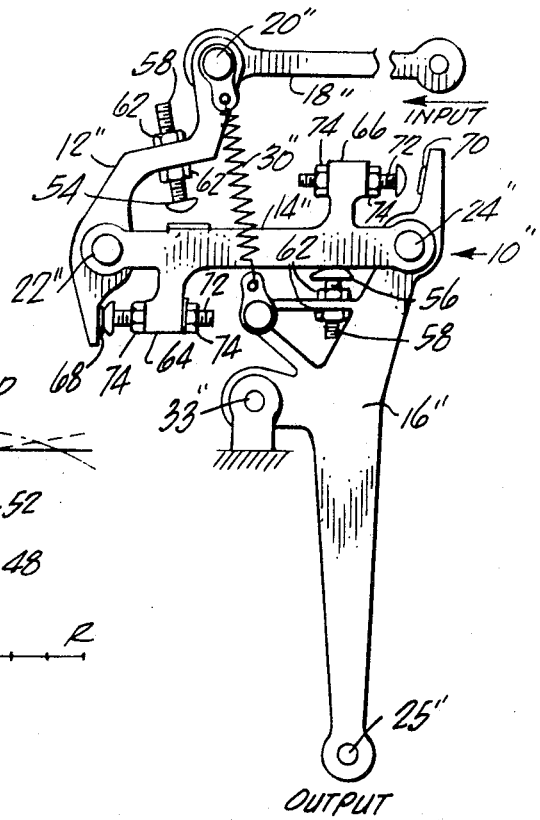
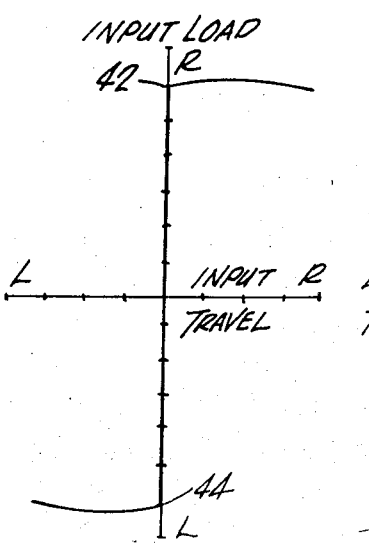
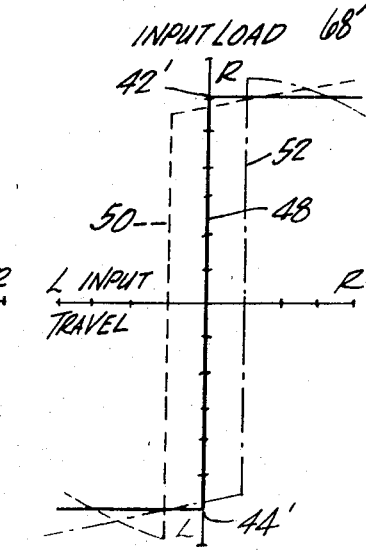
INVENTOR.
ALTON E. FARR
BY
George W. Finch
ATTORNEY

3,633,435

BIDIRECTIONAL FORCE OVERRIDE

BACKGROUND OF THE INVENTION

A bidirectional override device is a useful addition in any linkage where it is desirable to allow relative motion between the input and output of an otherwise solid connection in the linkage such as when the loads therein become more than a predetermined level. This is especially true when the linkage forms a portion of an aircraft flight control system where breakage of the linkage due to unforeseen loads could be disastrous. The heretofore known bidirectional override devices include undesirable cams and/or antirattle adjustments and because of the complexity of the known devices, they are costly to manufacture. The known override devices also have a tendency to produce undesirable friction when in operation allowing relative motion between the input and output thereof. The friction generates heat and causes the devices to quickly wear out when subjected to hard use. The antirattle adjustments therein are also a constant source of maintenance problems.

SUMMARY OF THE INVENTION

The present bidirectional force override mechanisms are designed for low cost and simple manufacture and include no cams and a minimum of pivotal joints. This and the absence of any sort of antirattle adjustment makes the present mechanisms reliable and relatively maintenance free. The present mechanisms are also adaptable to various applications without substantial modification.

The mechanisms all allow relative motion between input and output linkage when the loads therein reach predetermined forces in either of two directions. Once the predetermined force has been reached, the mechanism goes into an override condition and allows the aforesaid relative movement between the input and output thereto, while maintaining the predetermined force in the linkage at a relatively constant level. When the load is reduced below the predetermined override force, the mechanism returns to its nonoverride or normal condition and thereafter it transmits motion and force therethrough as if the mechanism were solid link until the load again exceeds the aforesaid predetermined level.

It is therefore an object of the present invention to provide a bidirectional force override mechanism which responds to a relatively constant overriding force once overridden.

Another object of the present invention is to provide a bidirectional force override mechanism which requires no antirattle adjustments or cams.

Another object is to provide a bidirectional force override mechanism which is relatively economical to manufacture.

Another object is to provide a force override mechanism which has a minimum of joints and bearings.

Another object is to provide a force override mechanism which has low-internal friction when in an override condition.

These and other objects and advantages of the present override mechanisms will become apparent after considering the following detailed specification which covers preferred embodiments thereof in conjunction with the accompanying drawing, wherein:

BRIEF DESCRIPTION OF THE DRAWING

FIG. 1 is a side view of a bidirectional force override mechanism constructed according to the present invention;

FIG. 2 is a graph of the input force to input travel characteristics of the mechanism of FIG. 1 with the output thereof fixed;

FIG. 3 is a side view of a modified bidirectional force override mechanism similar to the mechanism shown in FIG. 1;

FIG. 4 is a graph of the input force to input travel characteristics of the mechanism of FIG. 3 at three different fixed positions of the output thereof; and FIG. 5 is a side view of another modified bidirectional force override mechanism similar to the mechanism shown in FIG. 1 in an override condition.

DESCRIPTION OF THE SHOWN EMBODIMENTS

Referring to the drawing more particularly by reference numbers, number 10 in FIG. 1 refers to a bidirectional force override mechanism constructed according to the present invention. The mechanism 10 includes a first link 12, a second link 14 and an output link 16. The input motion and forces to the mechanism 10 can be applied by means such as reciprocating input rod 18 which is shown pivotally attached to the outer end of the first link 12 by pivot 20. The opposite end of the first link 12 is connected for rotation to one end of the second link 14 by pivot 22. The other end of the second link 14 is pivotally connected for rotation by pivot 24 to one end of the output link 16, at whose other end the output point 25 of the mechanism 10 is usually placed. The labels, input and output, are only for convenience in description of the mechanism. The mechanism 10 can accept inputs at the output point 25 to provide bidirectional force override outputs to the rod 18 if that is desired.

The first link 12 and the output link 16 each include abutment means 26 and 28 associated with pivots 22 and 24 respectively. The abutment means 26 and 28 abut intermediate portions of the second link 14 with a predetermined force. The predetermined force is applied thereto by means of a spring 30 connected between the first link 12 and a pivot 33 to urge the abutment means 26 and 28 against the second link 14. The abutment means 26 and 28 are sized and positioned so that the centerline 31 of the second link 14 between pivots 22 and 24 forms a predetermined acute angle with the center line 32 of first link 12 between pivots 20 and 22 and approximately a right angle to the direction of force applied by spring 30. The acute angle between centerlines 31 and 32 is preferably 45° as this angle has been found to give optimal and relatively constant force override performance.

As can be seen in FIG. 1, the output link 16 is affixed for rotation to stationary structure by means of pivot 33. When the loads exerted across the mechanism 10 are below a predetermined load which is partially determined by the spring constant and preloading of the spring 30, the mechanism 10 is in its nonoverride condition and the entire mechanism 10 rotates about pivot 33 which causes the pivot 20 on the outer end of the first link 12 to follow a circular path 34. At the same time, the output point 25 follows a circular path 36 in unison therewith and therefore the entire mechanism 10 acts as though it were a solid link rotating about the pivot 33.

When the load across the mechanism 10 reaches the predetermined override value and the force applied by the input rod 18 is toward the left, the spring 30 is stretched and the first link 12 rotates about pivot 22 so that pivot 20 follows path 38 thereby allowing motion of the input rod 18 to the left while the output point 25 remains relatively stationary.

Similarly when the input rod 18 applies more than the predetermined override load to the right, the spring 30 is again stretched and the second link 14 rotates about pivot 24 which causes pivot 20 to move in path 40 again allowing motion of the input rod 18 without corresponding motion of the output point 25.

When the mechanism 10 is in an override condition and the spring 30 is stretched more and more, it applies an increasing load across the mechanism 10. The force that must be applied by the input rod 18 when the device is in the overridden condition relatively constant, however, because of the initial lateral offset of the pivots 22 and 24 from the spring axis 41 and the angles between the links. This is shown in FIG. 2 which is a graph of input load versus input travel for the mechanism 10 as shown in FIG. 1. As can be seen, once the predetermined load either to the right as shown by point 42 or to the left, as shown by point 44 is exceeded, the load thereafter is relatively constant during which time input travel to the right or to the left is allowed even though the output point 25 does not necessarily move in relation thereto.

A modified for 10' of the mechanism 10 is shown in FIG. 3 with similar portions thereof having the same numbers with the addition thereto of a prime ( ). The mechanism 10 of FIG. 3 operates in a manner similar to that of mechanism 10 of FIG. 1, except that the output link 16' thereof is connected to stationary structure by pivot point 33' at one extremity of the link 16' instead of at a central location as is shown in FIG. 1. Also the spring 30' is connected between pivot 20' and an extension 46 which forms a portion of the output link 16' rather than from the pivot 20 to pivot 33 as shown in FIG. 1. The extension 46 is so positioned as to bisect the second link 14' and so the end of the spring 30' attaches to the output link 16' on the center line 31' of the link 14'. The spring 30' of FIG. 3 is therefore shorter than the spring 30 of FIG. 1 and percentage wise is stretched more and at different angles by a given amount of override movement. This difference in geometry varies the input load characteristics versus input travel. This is shown by curve 48 in FIG. 4 wherein once the input load has reached either of the predetermined load points 42' and 44', the input overload to produce input travel thereafter is more nearly constant than that shown in FIG. 2.

FIG. 4 also shows the input load characteristics versus input travel of the mechanism 10' when the input and output thereof have already traveled a predetermined distance before the override load condition is reached. The dashed line 50 shows the input load versus input travel characteristics of the mechanism 10' when the mechanism 10' is offset to the left about pivot 33', whereas the dash and dot line 52 shows the input load versus input travel characteristics of the mechanism 10' when offset to the right. As can be seen in FIG. 4, the input load is relatively constant to provide a constant override force no matter what the position of the mechanism 10'. It should also be noted that the input load versus input travel characteristics of the mechanism 10' are similar whether it is overriden to the left or to the right.

The mechanism 10'' shown in FIG. 5 is also similar to the mechanism 10 shown in FIG. 1 and has its similar portions labeled with the same number as FIG. 1 but with two primes ('') added thereto. The mechanism 10'' of FIG. 5 includes additional features which make it adaptable to special situations. The mechanism 10'' includes adjustable abutment means 54 and 56 which correspond in function and location to the abutment means 26 and 28 of FIG. 1. The adjustable abutment means 54 and 56, however, include threaded members 58 and nuts 62 therefor so that the placement of the abutment surfaces thereof can be adjusted for wear of the abutment surface of the second link 14'' or to adjust the angles between the first link 12'', the second link 14'' and the output link 16'' to skew the input load versus input travel characteristics as desired. Skewing of the characteristics can also be accomplished by relocating the connection points of the spring 30'' away from the bisector of the link 14''.

The mechanism 10'' of FIG. 5 also includes override stop abutment means 64 and 66 on the second link 14'' which are associated with pivots 22'' and 24'', respectively. The override stop abutment means 64 and 66 are adapted to engage stops 68 and 70 on links 12'' and 16'' respectively. The abutment means 64 and 66 can be adjustable like the adjustable abutment means 54 and 56 and when so constructed they include threaded members 72 and nuts 74 therefor. As can be seen, the mechanism 10'' is shown in an override condition with the input pivot 20'' displaced to the left so that the stop abutment means 64 on link 14'' is engaged with stop 66 on link 12''. Therefore, further input motion to the left will result in motion of the output point 25'' of the output link 16''. The mechanism 10'' is useful in applications wherein a predetermined but limited amount of override action is desired.

Thus there has been shown and described novel bidirectional force override mechanisms which fulfill all the objects and advantages sought therefore. Many changes, modifications, variations and other uses and applications of the subject mechanisms will, however, become apparent to those skilled in the art after considering this specification and the accompanying drawing which disclose preferred embodiments thereof. All such changes, modifications, variations, and other uses and applications which do not depart from the spirit and scope of the invention are deemed to be covered by the invention which is limited only by the claims which follow.

What is claimed is:

1. A bidirectional force override mechanism including:
   a first link having first and second end portions;
   a second link having first and second end portions;
   first pivot means connecting said second end portion of said first link for rotation to said first end portion of said second link, said first pivot means including means to restrict the rotation between said first and second links in a first predetermined direction thereabout when said first and second links have a first predetermined angle therebetween;
   a third link connected for rotation about a point;
   second pivot means connecting said second end portion of said second link for rotation to said third link, said second pivot means including means to restrict the rotation between said second and third links in a second predetermined direction thereabout opposite from said first predetermined direction when said second and third links have a second predetermined angle therebetween; and
   bias means operatively connected between said first and third links to exert a predetermined force across said mechanism; whereby when connecting linkage is connected to said first end portion of said first link and to said third link movements and forces are transmitted through said mechanism until the forces exceed a predetermined value at which time said bias means are overcome and said first link pivots with respect to said third link to disconnect movements otherwise transmitted through said mechanism.

2. The mechanism defined in claim 1 wherein said bias means include at least one spring, said spring being connected to said first link and said third link so that said spring is normally equidistant from said first and second pivot means and so said spring acts perpendicular to a line therebetween.

3. The mechanism defined in claim 1 wherein said means to restrict rotation between said first and second links include:
   an abutment surface on one of said first and second links; and
   an adjustable abutment member connected to the other of said first and second links in position to abut said abutment surface when said bias means are not overcome, said adjustable abutment member being extendable and retractable so that said first predetermined angle between said first and second links can be adjusted.

4. The mechanism defined in claim 1 including:
   second means associated with said first pivot means to restrict the rotation between said first and second links in the direction opposite to said first predetermined direction when said bias means are overcome and said first and second links therefore have a different predetermined angle from said first predetermined angle therebetween.

5. The mechanism defined in claim 4 wherein said second means for restricting rotation between said first and second links include:
   an abutment surface on one of said first and second links and an adjustable abutment member connected to the other of said first and second links in position to abut said abutment surface when said bias means are overcome, said adjustable abutment member being extendable and retractable so that said different predetermined angle between said first and second links can be adjusted.

6. A bidirectional force override mechanism including:
   first linkage means pivotally mounted for rotation with respect to a reference structure, said first linkage means having means incorporated therewith for connection to movements and forces from outside said mechanism;
   second linkage means having means incorporated therewith for connection to movements and forces from outside said mechanism;

bias means connected between said first and second linkage means to apply a predetermined force therebetween;

first pivot means rotatably connecting said first linkage means to said second linkage means; and second pivot means rotatably connecting said first linkage means to said second linkage means, said first and second pivot means being positioned on opposite sides of the line of force of said bias means and on a line generally perpendicular to the line of force so that when force applied across said mechanism from outside said mechanism reaches a predetermined value in a first direction, said second linkage means rotate about said first pivot means straining said bias means and when force applied across said mechanism from outside said mechanism reaches a predetermined value in a direction opposite to said first direction, said second linkage means rotate about said second pivot means also straining said bias means.

7. The mechanism defined in claim 6 wherein said first pivot means include:

first means for restricting the rotation of said first linkage means with respect to said second linkage in a predetermined direction.

8. The mechanism defined in claim 7 wherein said first pivot means also include:

second means for restricting the rotation of said first linkage means with respect to said second linkage in a direction opposite to the restricted direction of said first restricting means.

9. The mechanism defined in claim 6 wherein said bias means include:

a spring positioned equidistant from said first and second pivot means.

10. The mechanism defined in claim 6 wherein said means incorporated in said second linkage means for connection to movements and forces from outside said mechanism include:

a reciprocating rod connected to said second linkage means for applying movements and forces thereto generally at right angles to the link of force of said bias means.

* * * * *